July 19, 1955  A. R. LONG ET AL  2,713,413
CONVEYOR DRIVE
Filed Feb. 24, 1948  3 Sheets-Sheet 1
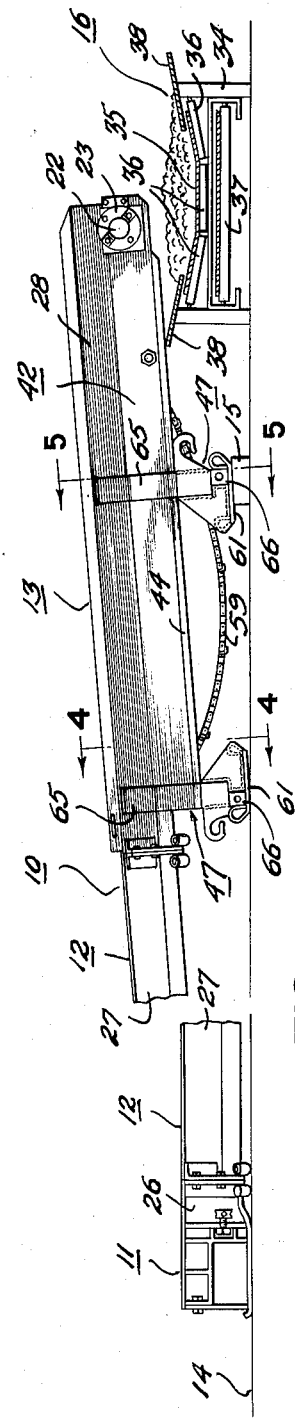
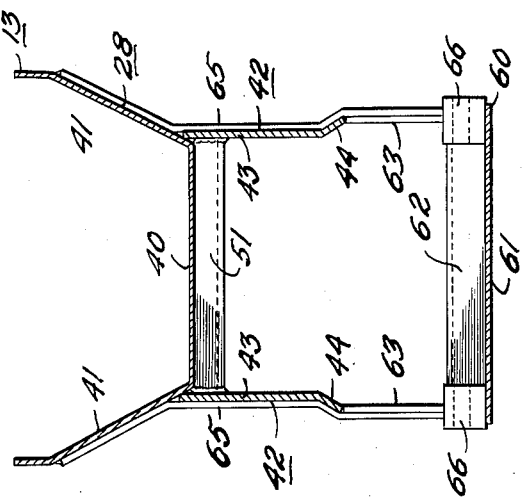
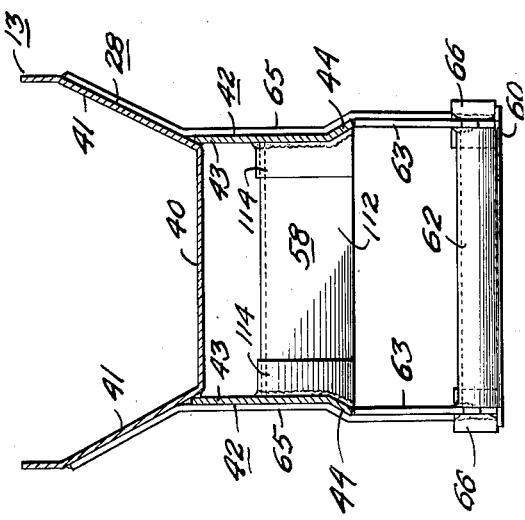
INVENTOR.
Armistead R. Long
John B. Long
BY *Lancaster, Allwine & Rommel*
ATTORNEYS.

July 19, 1955     A. R. LONG ET AL     2,713,413
CONVEYOR DRIVE

Filed Feb. 24, 1948     3 Sheets-Sheet 2

INVENTOR.
Armistead R. Long
John B. Long
BY
ATTORNEYS.

July 19, 1955 A. R. LONG ET AL 2,713,413
CONVEYOR DRIVE
Filed Feb. 24, 1948 3 Sheets-Sheet 3

INVENTOR.
Armistead R. Long
John B. Long
BY
ATTORNEYS.

United States Patent Office 2,713,413
Patented July 19, 1955

2,713,413

CONVEYOR DRIVE

Armistead R. Long, Fayetteville, and John B. Long, Oak Hill, W. Va.; Pauline McCauley Long and Chas. E. Mahan, executors of said Armistead R. Long, deceased, assignors to The Long Company, Oak Hill, W. Va., a corporation of West Virginia Application February 24, 1948, Serial No. 10,324

4 Claims. (Cl. 198—203)

The present invention relates to a head section for conveyors of the type embodying a tail section, which is normally the receiving end of the conveyor; a plurality of intermediate sections, commonly termed "pans"; a head section, which is normally the delivery end of the conveyor and includes a drive sprocket; and an endless conveyor chain provided with flights, the upper run of the chain moving in troughs of the tail, intermediate and head sections, and the lower run traveling therebeneath. In practice these sections are detachably connected together, so that intermediate sections may be placed or removed to increase or diminish the length of the conveyor and the chain length is correspondingly increased or diminished, so that the conveyor may be used in different mine workings and particularly lengthened as coal is removed therefrom.

In practice the conveyor may be of considerable length, say three hundred feet, by way of example, comprising one tail section, one head section and forty-seven intermediate sections or pans. The chain, carrying flights, for a conveyor of that length may comprise as many as thirty-two hundred link elements pinned together and commonly termed "block links" and "side bars." In order that these links will have flexibility, each block link must hang free on its pin. This means that all the slack is taken out of the pull or upper run of the chain and transferred to the lower run thereof. Therefore the lower run is appreciably longer than the upper run. The major portion of this lower run is usually supported, thru the flights, on rails beneath the troughs of the intermediate sections, and short lengths of rails beneath the troughs of the tail and head sections. The only practical place for accommodation of substantially all of the increased length of the lower run of the chain is beneath the head section. It is common practice to allow this additional length of chain to droop or swag, as by its own weight, under the drive sprocket and at the delivery end of the head section.

It is also common practice for one conveyor of this type to discharge into another conveyor with its axis normal to the axis of the first mentioned conveyor, or discharge directly into mine cars. This droop in the lower run of the chain has been a source of much concern to all using chain conveyors. The flights often foul on the cross conveyor, car, or other receiving unit receiving the discharged coal. This fouling causes the flights to bend or break, or break the chain itself, or damage other flight conveyors, or belts on belt conveyors, and in many instances has caused injury to workmen.

Furthermore, this droop in the lower run of the conveyor chain, leading from the drive sprocket, frequently results in the chain moving to a position out of motion transmitting relation to the drive sprocket causing excessive wear and rendering the conveyor inoperative. This is particularly true when the assembly of conveyor sections is of considerable length.

The principal object of our invention is to provide a head section which is so constructed and arranged that these, and other objectionable features of head pieces in common use, are obviated.

Another object is to provide a head section for flight conveyors which is so constructed and arranged that the delivery end thereof may be placed in close overhanging proximity to bodies of mine cars or the load supporting and moving portion of another conveyor without likelihood of the conveyor chain with flights, carried in part by the head section, and particularly the lower run of such chain, contacting the cars or adjacent conveyor. In the past it has been common practice to construct head sections with a sprocket at or adjacent the load delivery end, about which the conveyor chain is trained and to which sprocket power is delivered, so that the upper run of the chain is drawn substantially taut in the troughs of the tail section, pans and head section, and the lower run has a droop or swag in it beneath the delivery end portion of the head section. From this droop or swag the lower run of the chain is supported by a track or similar support at the rear portion of the tail section. The droop or swag has been considered essential in order that the chain will not be so tight between sprockets at the tail and head sections that its upper run will not follow upon the bottoms of the troughs, especially when there are declivities in the conveyor due to uneven mine floors or uneven supports for the conveyor sections.

Another object is to provide a head section for conveyors in which the traction on the drive sprocket is increased by transferring the droop or swag of the lower run from the zone adjacent the drive sprocket to a zone to the rear thereof and remote therefrom, thus reducing likelihood of the chain jumping off the sprocket, so to speak, which, in common practice may result in damage to the chain or equipment and a shut-down of the conveyor until repairs have been made or the conveyor chain again placed in operative relation to the sprocket.

A further object is to provide in a head section, means to prevent the conveyor chain from carrying fine coal and/or slate over to the drive sprocket, and to accomplish this without expensive fabrication of the trough of the head section at its delivery end. This is in part accomplished by supporting the drive sprocket so that the uppermost root of the teeth thereof is in a plane well above the plane of the trough bottom, thus permitting use of a trough which may be of substantially uniform cross section from one end of the head section to the other end thereof, the trough bottom being slotted for the accommodation of a segment of the sprocket projecting above the plane of the trough bottom, and then providing that which may be aptly termed a "ramp" associated with the trough, chain and sprocket which will remove substantially all the coal or other substances from the chain before it is drawn onto the sprocket. The ramp is preferably made so that it supports the chain in the zone of the sprocket to prevent a downward wear on the sprocket.

Another object is to provide a head section, the main supporting elements of which are pedestals, devoid of any pan-like bottom therebetween, and with the sides of the head section constructed and arranged, so as to reduce the likelihood of dirt and matter shaken from the conveyor chain accumulating in the zone of the droop in the lower run of the conveyor chain to the extent where it will interfere with proper functioning of the head section and to permit easy removal of the dirt of the head section is used in a low ceiling mine working and supported on or closely adjacent the floor, in contradistinction to being cribbed up to a loading height.

Other objects and advantages will appear in the following detailed description of a highly satisfactory embodiment of our invention, taken in connection with the accompanying drawings, forming a part of this specification, and in which drawings:

Fig. 1 is a view partly in side elevation showing a conveyor embodying a head section constructed according to our invention, portions of intermediate or pan sections being broken away to condense the view, and partly in vertical section thru a conventional endless belt conveyor in load receiving relationship to the head section.

Figs. 4 and 5 are enlarged cross sectional views on the lines 4—4 and 5—5 of Fig. 1, but with the conveyor chain and flights removed.

Figure 6:
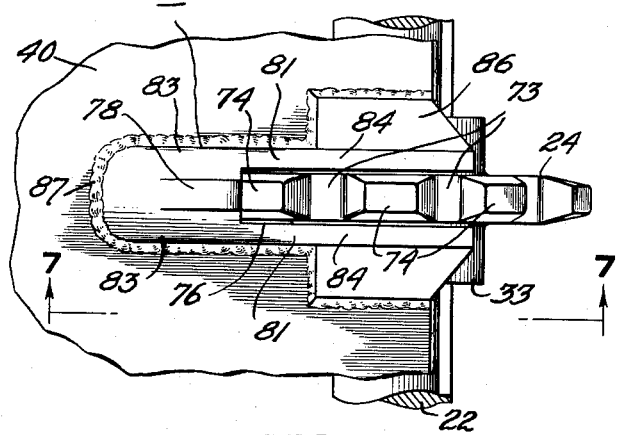

Fig. 6 is an enlarged fragmentary plan view of that portion of the head section in the zone of drive sprocket and showing our improved ramp associated with the latter, upon which the conveyor chain may move.

Figure 7:
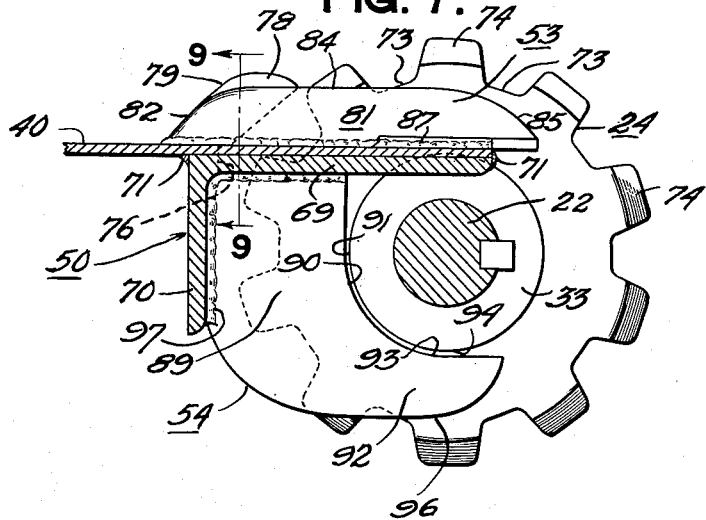

Fig. 7 is a sectional view on the line 7—7 of Fig. 6.

Figure 8:
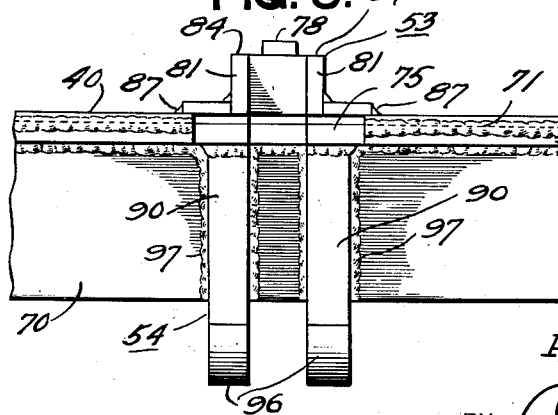

Fig. 8 is an elevational view looking toward the right side of Fig. 6, but with the drive sprocket and its shaft removed.

Figure 9:
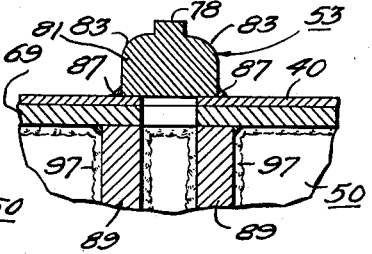

Fig. 9 is a vertical sectional view on the line 9—9 of Fig. 7.

In the drawing, and referring more particularly to Fig. 1, a conveyor 10 is shown as comprising a tail section 11, a plurality of intermediate or pan sections 12, and a head section 13. By way of example, the tail section is shown resting upon the mine floor 14 as is also one of the pan sections, next adjacent thereto. The head section is shown with its rear end portion supported on the floor and its delivery end portion elevated by a block 15 interposed between the floor and a portion of the head section. The latter partially supports another pan section, in an inclined position, and beneath the delivery end of the head section is shown a belt conveyor 16, by way of example, receiving material from the head section. The sections 11 and 12, and the conveyor 16 form no part of the present invention, but it is pointed out that throughout the length of the conveyor 10 there may be several pan sections 12 interposed between the tail and head sections some of which may incline upwardly and forwardly, and some may incline downwardly and forwardly due to uneven floor, lack of care in blocking-up low sections, and for slightly elevating the load to a loading height.

The conveyor 10 is also shown as including an endless conveyor chain 17 comprising block links 18, side bars 19 and chain pins 20, together with flights 21 carried by the chain; a transversally extending drive shaft 22 carried by bearings 23 of any approved character and a drive sprocket wheel 24 having a cylindrical hub 33 about which the chain 17 is trained, so as to provide an upper run 25 of chain, traveling in troughs 26, 27 and 28 of the sections 11, 12 and 13, respectively and a lower run 29 of chain traveling beneath said troughs. While the chain 17 with flights 21 may be of any suitable construction we prefer to use the type disclosed in our copending application for patent filed February 2, 1948, Serial No. 5698 and now Patent No. 2,657,787 where the flights are shown extending laterally of the side bars and have a rounded surface 30 between angularly related flanges 31 and 32 well adapted to travel over and bear upon certain preferred elements of the head section as hereinafter described.

The conveyor 16, as shown in Fig. 1, comprises a frame 34; an endless belt 35 with its upper run supported on rollers 36 constructed and arranged to give it trough-like formation and its lower run supported on rollers 37, the rollers being carried by frame 34; and, skirt boards 38 also supported by the frame 34 at opposite sides thereof, the skirt boards being in planes converging downwardly and inwardly toward the longitudinal axis of the conveyor 16. It is to be understood that any form of conveyor may be placed in operative relation to the conveyor 10 and the description of the type specifically disclosed is merely to emphasize some important characteristics of the present invention. The conveyor 10 may deliver the load to a mine car or a chute, not shown in the drawing, or permit the load to fall into a pile, to be subsequently moved.

Figure 2:
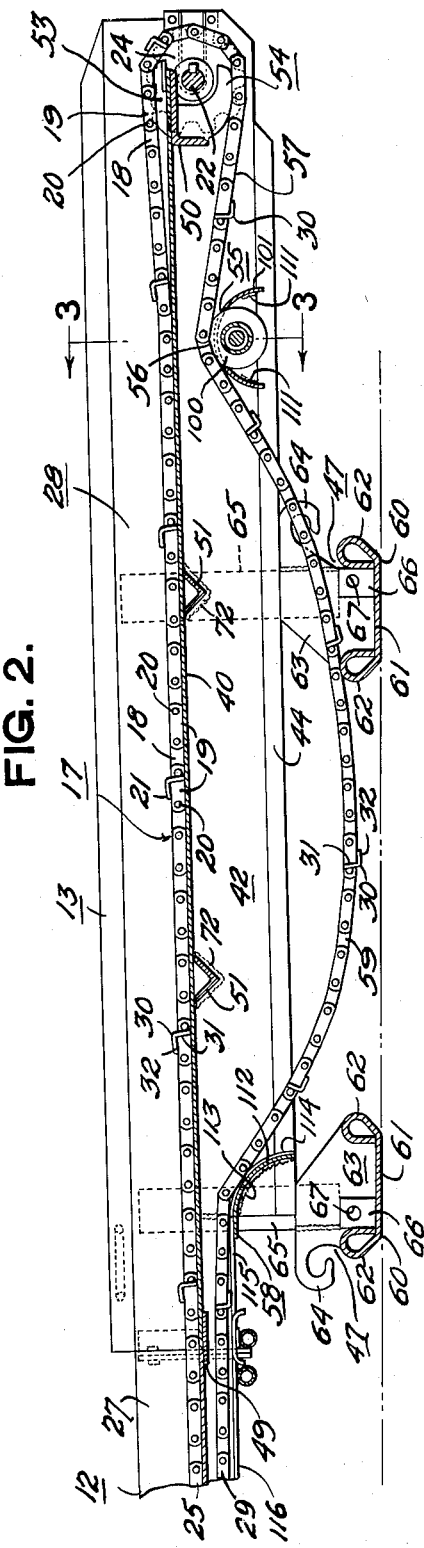
Fig. 2 is an enlarged vertical sectional view longitudinally of the head section and showing a portion of an intermediate section of the conveyor in coupled relationship thereto.
Figure 3:
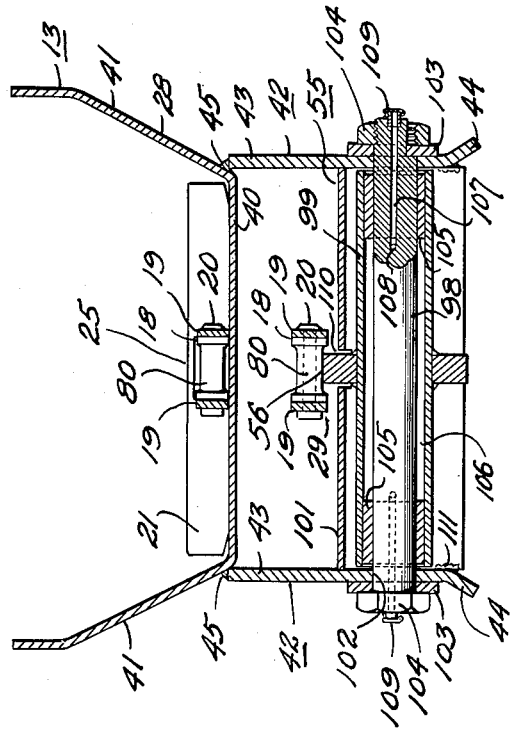
Fig. 3 is an enlarged cross sectional view on the line 3—3 of Fig. 2.

Referring now to the head section per se, it comprises the trough 28 preferably shaped in cross section as shown in Figs. 4 and 5 to have a flat bottom 40 and outwardly and upwardly inclined sides 41; longitudinally extending side plates or stringers 42 extending throughout the greater portion of the length of the trough and each preferably comprising a deep web 43 and an outwardly turned lower flange 44, the upper margin of the web 43 being shown secured to the trough at the juncture between the bottom 40 and side 41 as by weld 45, as shown in Fig. 3; two spaced apart pedestals 47 supporting the trough 28 and stringers 42 a considerable distance from the floor 14 or other support; a rear transverse support 49, a front transverse support 50 and one or more intermediate transverse supports 51 secured to the underside of the trough bottom 40 and to the stringers 42 at their confronting faces; an upper ramp 53 associated with drive sprocket 24; a combined chain stripper and safety device 54, associated with drive sprocket 24 and drive shaft 22; a hurdle-like guide 55 beneath the trough 28 and spaced rearwardly of the drive sprocket and with its crown portion 56 sufficiently above the lowermost portion of the latter to draw the chain 17 into intimate contact with the drive sprocket throughout an arc of substantially 180° as shown in Fig. 1 and to draw a strand 57 of the lower run of the chain taut; and a rear lower ramp 58 adjacent the rear end of the head section cooperating with the guide 55 to create a drooping strand 59 in the lower run of the chain, remote from the delivery end of the head section, as shown in Figs. 1 and 2.

The pedestals 47 may each comprise a sled-like base 60 which may be fabricated from sheet metal to provide a flat elongated web portion 61, with upwardly projecting transversely curved return flanges 62 extending longitudinally of the web portion; a gusset plate 63 for each end of the base 60 which may include hook-like projections 64, useful in attaching tow chains, not shown in the drawing, to facilitate moving the head section from place to place; and an upright, combined attaching and reinforcing strap 65 for each end of the base 60. A suitable block 66 having transverse apertures 67 may be provided at the end of each pedestal base 60 to facilitate attachment of a power unit, not shown in the drawing, to either side of the head section, for operating the drive shaft 22. Each strap 65 may be secured and shaped to follow the contours of the outer faces of the plate 63, the offset flange 44 and web 43 of stringer 42 and the side 41 of trough 28 of its respective pedestal and side of the head section.

It will be noted that the widely spaced pedestals 47 provide a large open space beneath the major portion of the drooping strand 59 thus permitting any fine coal that may be carried by the conveyor chain shaken off therefrom in the zone of the strand 59 to spread out to each side and not accumulate as it may if a pan, such as is commonly used, is provided as a base for the head section. If the head section is cribbed up to a loading height, the fine coal thus shaken off the chain may drop to a zone remote from the head section, and if the head section rests upon the floor 14 or closely adjacent thereto, as shown in Figs. 1 and 2 any accumulation of fine coal which might interfere with proper functioning of the drooping strand 59 may be shoveled or raked from that zone, something quite difficult if not impossible, where the pan with upturned flanges, forms the base of the head section.

The rear transverse support 49 may be in the nature of a plate extending beyond the rear end of trough 28 to engage the under surface of the trough 27 of the adjacent pan 12 coupled to the head section. The front support 50 may be a rolled metal angle section including a horizontal flange 69 and a vertical flange 70, the former being welded or otherwise secured to the trough bottom 40 as by welds 71. The supports 51 may also be rolled metal angle sections, arranged as shown in Fig. 2, and secured to the stringers 42 as by welds 72.

As shown more particularly in Figs. 2, 6 and 7, the shaft 22, supports the drive socket 24 so that it rotates in a vertical plane longitudinally of the trough 28 at the delivery end of the head section, with the uppermost roots 73 of the sprocket teeth 74 in a plane spaced a considerable distance above the plane of the trough bottom 40. The flange 69 of front support 50 as well as the trough bottom 40 is provided with an elongated slot 76 extending longitudinally of the head section and open at the delivery end thereof, for accommodation of the upper segment of the drive sprocket and its hub 33. Thus the forward end of the upper run 25 of chain 17 is elevated from contact with the trough bottom 40 as shown in Fig. 2, because of this elevated position of the sprocket 24, permitting some of the coal carried by the links of the chain to free itself from the chain. However, to prevent the conveyor chain from carrying fine coal or other material, such as slate over to the drive sprocket, we provide the upper ramp 53 which performs several functions. It may be made of cast or forged metal and comprises a forward central ramp portion 78 which may be likened to a false sprocket tooth in that it has an upper tread surface arcuated in the plane of the sprocket wheel, like the crown of a sprocket tooth, and of a width approximately the width of the sprocket teeth 74, as shown in Fig. 6, and has a forward inclined surface 79 upon which the spools 80 of the block links 18 of chain 17 ride and are elevated before they engage the teeth of the drive sprocket, this ramp portion 78 being disposed in the plane of the sprocket in advance of and closely adjacent to the sprocket; and a lateral ramp portion 81 to each side of and closely adjacent the sides of the sprocket upon which the side bars 19 of the chain ride. The lateral ramp portions 81, have forward inclined surfaces 82, upon which the side bars 19 are elevated to zones at each side of the uppermost segment of the drive sprocket. It is preferred to also round off laterally the forward ends of the lateral ramp portions as indicated at 83 so as to divert fine coal and other material, freed from the chain, away from the zone of the drive sprocket. However intermediate sections of the lateral ramp portions 81 may have flat upper surfaces 84 so as to act as substantial rails for the chain side bars 19. It is also preferred to round off the rear end of each lateral ramp portion 81 as indicated at 85 so as to permit the conveyor chain to travel with the drive sprocket in normal operation of the conveyor. In order to secure the upper ramp 53 firmly to the trough 28 we prefer to provide each ramp portion 81 with a lateral base flange 86 to rest upon the trough bottom 40, and the ramp 53 may be secured thereto by weld 87 which may skirt the margins of the flanges 86 as well as the bases of the ramp portions 78 and 81, as shown in Figs. 6–9.

In operation, the ramp 53 functions to shake fine coal and other material from the chain when the conveyor is operating at normal speed, due to the spools of the block links and the side bars of the chain encountering the forward ends of the ramp portions 78 and 81 and causing some pivotal movement of the block links on the chain pins.

The combined chain stripper and safety device 54 preferably comprises two plate-like members each including a body portion 89, provided with an arcuate abutment surface 90 confronting the cylindrical portion 91 of hub 33 facing in the direction of the runs 25 and 29 of the conveyor chain, and an arm 92 extending from the body portion 89 beneath the hub, provided with an upper abutment surface 93 confronting the lower cylindrical portion 94 of the hub and a lower guide surface 96 leading from the free end of the arm toward the bottom of the body portion 89, preferably struck from an arc tangential to the upper surface of the lower run of the chain 17 as shown in Fig. 2. These plate-like members may be secured rigid with the trough by having their upper margins secured to the flange 69 and their rear sides secured to the flange 70 as by welds 97. Preferably the faces 90 and 93 merge into one another, and struck from a radius slightly greater than the radius of the hub. The device 54 is arranged that, during normal operation of the conveyor, the faces 90 and 93 are slightly spaced from the hub 33, but if the conveyor is subjected to an excessive load, tending to draw the shaft 22 in the direction of the tail section 11, excessive springing of the shaft is resisted by contact of the hub with these surfaces 90 of the device 54. In a similar manner the surfaces 93 prevent excessive downward springing movement of the shaft 22.

The hurdle-like guide 55 differs materially in its function from idlers used to guide a strand of the lower run of a conveyor chain to rails of the head section or adjacent pan section, as is common practice. The guide 55 has many functions, such as to guide the chain in hurdle-like fashion, so as to draw the strand 57 of the chain 17 taut and into intimate contact with the drive sprocket 24 throughout substantially 180°, instead of drooping downwardly from the sprocket with substantially less contact of the chain and sprocket than 180°; and to assist in bracing the head section laterally. The guide preferably comprises a transversally extending stationary shaft 98 about which extends a revoluble hollow shaft 99 supporting a centrally located roller 100, and a transversally arched ramp-like elongated member 101 spaced above the shafts 98 and 99. The shaft 98 extends crosswise between the stringers 42 and thru openings 102 in the latter, suitable washers 103 and nuts 104 being provided on the ends of the shaft of the exterior faces of the stringers as shown in Fig. 3. The shaft 99 may be provided at its ends with cylindrical bearings 105 having a forced fit in the hollow of the shaft and bearing on the shaft 98. Thus a reservoir 106 is provided for lubricating oil between the shafts 98 and 99 and the bearing 105. This oil may be introduced into the reservoir thru axial and transverse ways 107 and 108, respectively, located in each end portion of shaft 98, the entrance ends of the ways 108 may be closed by suitable caps 109. The member 101 is provided with an elongated, centrally located transverse slot 110 thru which the roller 100 extends. The ends of member 101 may be secured to the inner faces of the stringers 42 as by welds 111. The function of roller 100 is to engage spools 80 of the block links of chain 17 as shown in Fig. 3, and the extent to which the roller projects above the upper surface of member 101 is preferably such that the flights 21 barely touch this upper surface in normal operation. However, if the chain should become disengaged from the roller 100, the member 101 in cooperation with the outwardly flared flanges 44 of the stringers 42 will cause the flights 21 engaging these elements to replace the chain in operative relation to the roller.

It is to be understood that these details have been found in actual reduction to practice to be highly efficient, however, it is evident that the hurdle-like guide may take other forms, such as omission of the shafts 98 and 99, and the roller 100, using the member 101 as a hurdle, contacted by both links and flights of the conveyor in the operation thereof.

In common practice, the chain 17 does not grip the drive sprocket 24 for more than approximately an arc of 90°, because of the droop in the chain which usually starts at the drive sprocket. According to our invention the chain, thru the cooperation of the guide 55, grips the drive sprocket thruout an arc of approximately 180°. This enables our head section to be used with very long conveyors without the chain slipping on the sprocket.

The rear lower ramp 58 may comprise a ramp body 112 which may be made from an elongated sheet of metal arcuated transversally, disposed between the rear end portions of the stringers 42 and secured to the inner faces thereof as by welds 113; and in the example shown, more particularly in Figs. 2 and 4, arcuate wear strips 114 at opposite end portions of the ramp body 113, upon which the flights 21 may ride, the chain being mainly guided to the track beneath the pan 27 by the ramp body. The strips 114 are aligned with strips 115 secured to the rear end of the head section for aligning relation with rails 116 common to pan sections as shown in our copending application for patent disclosing Pans for Conveyor Chains, filed May 5, 1947, Serial No. 745,896, now Patent 2,536,950.

In practice it has been found best to locate the hurdle-like guide 55 spaced from the rear ramp 58 a distance more than three times the distance between the guide 55 and drive sprocket 24. This distance is sufficient at all times, to hold the chain tight between the drive sprocket and guide 55 and at the same time give the chain more room to adjust itself to the difference in length between the upper and lower runs of chain, so as to droop of its own weight in the zone between guide 55 and ramp 58, as shown in Figs. 1 and 2.

It will be noted in Fig. 1 where the head section 13 is shown in a possible position with respect to an ordinary belt conveyor 16 for delivery of the load thereupon, that the delivery end of the head section may be placed close to the center of the upper run of the conveyor belt 35. In this arrangement there is no likelihood of the flight conveyor raking off coal from the belt conveyor or skirt board 36, and the latter may be arranged so close to the head section that the skirt board will catch and divert back onto the belt a large portion of the coal which will naturally stick to the chain 17 for a short space after passing over the drive sprocket 24. Most of the coal adhering to the lower run of the conveyor chain will fall off in the span between the drive sprocket and hurdle-like guide 55.

In effect our head section may be said to differ from those in common use in many respects, one difference being that it is trackless. The drooping strand 59 of the conveyor chain between the hurdle-like guide 55 and the ramp 58 being free of engagement with the head section, and the relative distance between the guide 55 and ramp 58 being many times greater than the distance between the drive sprocket 24 and guide 55, will cause the weight of the drooping strand 59 to pull the strand 57 of conveyor chain between the guide 55 and drive sprocket 24 taut, with the attendant advantages herein set forth.

We claim:

1. In a head section for chain conveyors of the class wherein the upper run of an endless chain comprising block links, side bars and pins connecting the block links and side bars, travels longitudinally over the bottom of a trough extending longitudinally of the head section, the combination of a drive sprocket rotatable in a vertical plane longitudinally of the trough at the delivery end thereof, disposed with the uppermost root of the sprocket teeth in a plane above the plane of the trough bottom, and a ramp for the chain, associated with said sprocket, comprising a center ramp portion disposed in the plane of the sprocket in advance of and closely adjacent to the sprocket, upon which the block links of the chain travel in their movement toward the sprocket, and lateral ramp portions to each side of said center ramp and extending therefrom closely adjacent the sides of the sprocket upon which the side bars of the chain travel, whereby the chain is elevated from the trough bottom as it approaches the sprocket and downward wear upon the sprocket is materially reduced.

2. In a head section for chain conveyors of the class wherein the upper run of an endless chain comprising block links, side bars and pins connecting the block links and side bars, travels longitudinally over the bottom of a trough extending longitudinally of the head section, the combination of a drive sprocket rotatable in a vertical plane longitudinally of the trough at the delivery end thereof, disposed with the uppermost root of the sprocket teeth in a plane above the plane of the trough bottom, and a ramp for the chain, comprising a center ramp portion disposed in the plane of the sprocket in advance of and closely adjacent to the sprocket, upon which the block links of the chain travel in their movement toward the sprocket, and lateral ramp portions to each side of the sprocket upon which the side bars of the chain travel, said center and side ramp portions having forward surfaces inclined toward the zone of the drive sprocket and the forward outer sides of the lateral ramp portions being grounded to divert fine coal and similar material laterally away from the zone of the drive sprocket.

3. In a head section for chain conveyors of the class wherein the upper run of an endless chain comprising block links, side bars and pins connecting the block links and side bars, travels longitudinally over the bottom of a trough extending longitudinally of the head section, the combination of a drive sprocket wheel rotatable in a vertical plane longitudinally of the trough at the delivery end thereof, disposed with the uppermost roots of the sprocket wheel teeth in a plane above the plane of the trough bottom, and a ramp for the chain, disposed in the plane of the sprocket wheel in advance of and closely adjacent the sprocket wheel, said ramp having an upper tread surface arcuated in the plane of the sprocket wheel and of a width approximately the width of the teeth of said sprocket wheel upon which the block links of the chain travel in their movement toward the sprocket wheel.

4. In a head section for chain conveyors of the class described, wherein the upper run of an endless chain, carrying flights extending laterally to each side thereof, travels longitudinally of a trough extending longitudinally of the head section, is trained about a drive sprocket wheel at the delivery end of the head piece with the upper run of the chain and flights traveling in the trough and supported upon the bottom thereof, and the lower run of the chain and flights traveling longitudinally beneath the trough, the improvement which comprises, a pair of stringer plates extending along the bottom of the trough and spaced apart a distance slightly greater than the flight length for accommodation of the flights therebetween, said stringer plates each provided with a downwardly and outwardly extending lower flange, means for supporting said stringers in an elevated position from the floor, guide means, over which pass the lower run of the chain and the flights carried thereby, said guide means comprising a roller upon which the lower run of the chain is normally engaged and supported, and a plate upon which said flights ride upon abnormal disengagement of the chain from said roller, said plate extending between and secured to the confronting faces of said stringer plates in the zone of said flanges thereof, arcuated transversally in the direction of travel of the chain, and provided with an opening in its upwardly curved portion through which the upper portion of said roller extends, said guide means located to the rear of the sprocket wheel in relatively close proximity thereto, and means for sustaining the lower run of the chain in close proximity to the underside of the trough at its rear portion, said last mentioned means being spaced from said guide means a distance relatively greater than the spacing of the latter from the zone of the sprocket wheel, whereby the run of chain between said last mentioned sustaining means and guide means will droop therebetween and draw taut the run of chain between said guide means and drive sprocket wheel.

References Cited in the file of this patent

UNITED STATES PATENTS

| | | |
|---|---|---|
| 983,301 | Murdock | Feb. 7, 1911 |
| 1,664,763 | Webb | Apr. 3, 1928 |
| 1,770,650 | Levin | July 15, 1930 |
| 1,917,134 | Levin | July 4, 1933 |
| 2,044,158 | Dunlop | June 16, 1936 |
| 2,089,047 | Zrna | Aug. 3, 1937 |
| 2,101,172 | Gegenheimer | Dec. 7, 1937 |
| 2,164,535 | McBride | July 4, 1939 |
| 2,263,458 | Gellatly | Nov. 18, 1941 |
| 2,386,619 | Long et al. | Oct. 9, 1945 |